United States Patent [19]
Kniese et al.

[11] 3,855,396
[45] Dec. 17, 1974

[54] METHOD OF CONTINUOUSLY PRODUCING COBALT CARBONYL HYDRIDE

[75] Inventors: Wilhelm Kniese, Limburgerhof; Juergen Plueckhan, Beindersheim; Rudolf Kummer, Frankenthal; Hans Juergen Nienburg, Ludwigshafen; Peter Tavs, Limburgerhof, all of Germany

[73] Assignee: Badische Anilin- & Soda Fabrik Aktiengesellschaft, Rhienland, Pfalz, Germany

[22] Filed: Jan. 24, 1972

[21] Appl. No.: 220,442

[30] Foreign Application Priority Data
Jan. 26, 1971  Germany............................ 2103454

[52] U.S. Cl................ 423/417, 423/22, 423/139, 423/418
[51] Int. Cl.................... C01g 1/04, C01g 51/02
[58] Field of Search ................... 423/416–418, 423/22, 139, 138

[56] References Cited
UNITED STATES PATENTS

| | | | |
|---|---|---|---|
| 1,858,220 | 5/1932 | Schlecht et al. | 423/417 |
| 2,477,553 | 7/1949 | McKeever | 423/417 |
| 2,477,554 | 7/1949 | McKeever | 423/418 |
| 2,985,504 | 5/1961 | Orchin | 423/417 |
| 3,236,597 | 2/1966 | Knap | 423/417 |
| 3,716,626 | 2/1973 | Kniese et al. | 423/418 |

*Primary Examiner*—Earl C. Thomas
*Attorney, Agent, or Firm*—Johnston, Keil, Thompson & Shurtleff

[57] ABSTRACT

Continuous production of carbonyls of metals of Group 8 of the Periodic Table by treatment of solutions of appropriate metal salts with an excess of carbon monoxide and hydrogen at temperatures of 50° to 200°C and at pressure of 50 to 500 atmospheres gauge in the presence of activated carbon, a zeolite or a basic ion exchanger which is loaded with the corresponding metal carbonyl. Solutions of metal carbonyls obtained by the process are suitable as catalyst solutions for carbonylatiion reactions, particularly for hydroformylation reactions.

6 Claims, No Drawings

METHOD OF CONTINUOUSLY PRODUCING COBALT CARBONYL HYDRIDE

The invention relates to an improved continuous process for the production of carbonyls of metals of Group 8 of the Periodic Table by treatment of solutions of corresponding metal salts with an excess of carbon monoxide and hydrogen.

It is known from German Printed Application No. 1,070,683 that cobalt carbonyls are obtained by treatment of an aqueous solution of a cobalt salt with excess hydrogen and carbon monoxide in the presence of a solvent which is not miscible with water. Apart from the fact that the use of a two-phase system is expensive because the two phases have to be separated from each other, the formation of cobalt carbonyls proceeds very slowly so that adequate conversion of the cobalt acetate used is not achieved for about 6 hours. Such a method is not suitable for continuous production of cobalt carbonyls. It is also known from German Printed Application No. 1,767,277 that cobalt carbonyls are obtained by treatment of aqueous solutions of cobalt acetate in the presence of aldehyde which are not completely miscible with water, the solution of the carbonyl in the aldehyde being separated from the aqueous phase and the aqueous phase being recycled. Apart from the fact that recycling the aqueous phase involves considerable expenditure, this method also requires an appreciable reaction period to achieve an adequate concentration of cobalt carbonyl in the aldehyde.

It is an object of the invention to provide a process by which the conversion of metal salts of Group 8 of the Periodic Table into the corresponding carbonyls proceeds more rapidly than hitherto.

Another object of the invention is to provide a process in which unreacted portions of metal salts do not have to be recycled.

In accordance with this invention these and other objects and advantages are achieved in an improved process for the continuous production of carbonyls of metals of Group 8 of the Periodic Table by treatment of solutions of the corresponding metal salts with an excess of carbon monoxide and hydrogen at temperatures of from 50° to 200°C and at pressures of from 50 to 500 atmospheres gauge, wherein the improvement comprises carrying out the treatment in the presence of activated carbon, a zeolite or a basic ion exchanger which is loaded with the appropriate metal carbonyl.

The metal carbonyl hydrides which form spontaneously from the corresponding metal carbonyls under the reaction conditions are regarded as being included in the metal carbonyls obtainable by the invention.

Generally the starting materials used are sulfates, chlorides, nitrates or fatty acid salts or naphthenates of metals of Group 8 of the Periodic Table. Fatty acid salts or naphthenates have proved to be particularly suitable. The process has special importance for the production of cobalt and rhodium carbonyls. When the starting materials are soluble in water, for example chlorides, sulfates, nitrates or salts of lower fatty acids of the said metals, water is generally used as the solvent. When salts of higher fatty acids or naphthenates are used, a suitable solvent is used, for example an alkanol such as methanol or butanol or an alkanal, for example butyraldehyde, or a saturated hydrocarbon such as benzene, toluene, cyclohexane or hexane. It is convenient to start with solutions which contain from 0.1 to 2% by weight of the said metals in the form of their metal salts.

The reaction is carried out with a mixture of carbon monoxide and hydrogen in the volumetric ratio from 4:1 to 1:4, particularly in the volumetric ratio from 2:1 to 1:2. It is advantageous to use the said gas mixture in an excess for example of up to 10% molar.

The treatment is carried out in the presence of activated carbon, a zeolite or a basic ion exchanger which is loaded with the appropriate metal carbonyl. Examples of suitable types of activated carbon are peat charcoal or charcoal from sugar. Peat charcoal which has been activated with zinc chloride has proved to be particularly suitable. Natural zeolites with three-dimensional structure or synthetic zeolites (molecular sieve with pore diameters of 4 to 12 A) are preferred zeolites. Basic ion exchangers which contain primary, secondary or tertiary amino groups are preferred. Ion exchangers based on polystyrene and which contain tertiary amino groups in the basic form have acquired particular importance. Weakly to strongly basic ion exchangers, for example AMBERLITE IR 45 and DOWEX 4 are particularly suitable. Macroreticular types such as AMBERLYST A 21, LEWATITE MP 62, LEWATITE MP 64, IMAC A 20, ZEOLITE G and AMBERLITE IRA 93 have acquired particular industrial importance. The basic ion exchangers are advantageously loaded with the corresponding metal carbonyl to the point of saturation; this is generally achieved by passing solutions of the corresponding metal salts together with the said gas mixture of carbon monoxide and hydrogen under the specified reaction conditions over the basic ion exchanger until it is saturated, i.e. until the corresponding metal carbonyl can be detected analytically in the discharge.

The treatment is advantageously carried out in a treatment zone which advantageously has a length/diameter ratio of 5:1 to 50:1. A loading of from 0.5 to 50 g of metal in the form of the said salts is maintained per hour per kilogram of activated carbon, zeolite or basic ion exchanger.

The treatment is carried out at temperatures of from 50° to 200°C. When active carbon or a zeolite is used, temperatures of from 80° to 160°C have proved to be particularly favorable. On the other hand it is advantageous to maintain temperatures of from 100° to 120°C when using basic ion exchangers. Pressures of from 50 to 500 atmospheres gauge are maintained in the treatment. Pressures of from 80 to 300 atmospheres gauge have proved to be advantageous.

The process of the invention may be carried out for example by arranging active carbon or the said basic ion exchanger rigidly in a high pressure tube and introducing a solution of the said Group 8 metal salts in the said concentration together with carbon monoxide and hydrogen in the said ratio of the bottom while maintaining the said conditions of temperature and pressure. After the solution has been saturated, the corresponding metal carbonyl solution is obtained at the top of the tube. Since the metal carbonyl obtained is often used for carbonylation reactions, for example for the oxo reaction, it is convenient to supply the mixture of liquid and gas obtained (which contains the corresponding metal carbonyl) as catalyst solution without separation to the carbonylation reaction.

The process of the invention is illustrated in the following Examples.

EXAMPLE 1

180 g of activated carbon (peat charcoal AKT IV, granules 3.4 to 4.5 mm) is placed in a high pressure tube having a capacity of 500 ccm. 30 ml of aqueous cobalt acetate solution containing 1.0% by weight of cobalt and an equimolar weight of carbon monoxide and hydrogen are passed in per hour and a temperature of 140°C and a pressure of 280 atmospheres gauge are maintained. The corresponding amount of aqueous solution and 120 liters (STP) per hour of offgas are withdrawn at the end of the tube. After a running-in period of one day, the content of cobalt carbonyl and of cobalt $^{+2}$ in the effluent solution and in the offgas is determined. The values for an experiment lasting 6 days may be seen in the following Table.

| Time (days) | Composition of the liquid effluent (mg/h) | | | CO in offgas (mg/h) |
| --- | --- | --- | --- | --- |
| | HCo(CO)$_4$ | Co$^{+2}$ | total Co | |
| 1 | 145 | 27 | 171 | no analysis |
| 2 | 202 | 33 | 234 | 60 |
| 3 | 195 | 33 | 228 | 62 |
| 4 | 161 | 35 | 220 | 71 |
| 5 | 169 | 31 | 215 | 73 |
| 6 | 170 | 32 | 209 | 81 |

EXAMPLE 2

The procedure described in Example 1 is followed but a temperature of 90°C is maintained. After 6 days the effluent reaction mixture contains 149 mg of cobalt per hour in the form of cobalt carbonyl hydride in the aqueous solution, 30 mg of cobalt per hour as Co$^{+2}$ in the aqueous solution, and 112 mg of cobalt per hour as cobalt carbonyl hydride in the offgas.

EXAMPLE 3

The procedure described in Example 1 is followed but a temperature of 60°C is maintained. After a running-in period, the following distribution of cobalt is set up in the effluent: 131 mg of cobalt per hour as cobalt carbonyl hydride in the aqueous solution, 38 mg of cobalt per hour as Co$^{+2}$ in the aqueous solution and 119 mg of cobalt per hour as cobalt carbonyl hydride in the offgas.

EXAMPLE 4

The procedure described in Example 1 is repeated but a methanol solution of cobalt acetate is used which contains 1% by weight of cobalt and a mixture of carbon monoxide and hydrogen in a volumetric ratio of 1:2. The liquid reaction mixture discharged contains 0.9% by weight of cobalt as cobalt carbonyl hydride and 0.08% by weight of cobalt as Co$^{+2}$. No cobalt carbonyl hydride is contained in the offgas.

EXAMPLE 5

A high pressure tube having capacity of 0.5 liter and a diameter of 30 mm is charged with 210 g of AMBERLYST A 21 (a weakly basic macroporous anion exchanger available from Union Carbide Corporation). 30 ml of aqueous cobalt acetate solution containing 300 mg of Co$^{+2}$ and an equimolar mixture of carbon dioxide and hydrogen are metered upwardly per hour, while a temperature of 120°C and a pressure of 280 atmospheres gauge are maintained. The anion exchanger is loaded with cobalt carbonyl over 7 days. After about 10 days full activity is achieved. Then a 30 ml sample contains 18 mg of Co$^{+2}$ and 129 mg of cobalt as cobalt carbonyl hydride and 148 mg of cobalt is discharged per hour as cobalt carbonyl hydride with the offgas.

If the amount of cobalt acetate solution metered in is increased to 80 ml per hour (i.e. 800 mg Co$^{+2}$ per hour), 80 ml of the reaction solution obtained contains 176 g of cobalt per hour in aqueous solution as Co$^{+2}$ and 416 mg of cobalt per hour as cobalt carbonyl hydride in aqueous solution, and the offgas contains 282 mg of cobalt per hour as cobalt carbonyl hydride.

EXAMPLE 6

A high pressure tube having a capacity of 0.5 liter and a diameter of 30 mm is filled with 320 g of zeolite (ZEOLON of Norton Co., one-sixteenth inch pellets, cation Na$^+$). 30 ml of an aqueous cobalt acetate solution containing 300 mg of Co$^{+2}$ and also an equimolar mixture of carbon monoxide and hydrogen are metered in upwardly per hour, a temperature of 120°C and a pressure of 280 atmospheres gauge being maintained. Sodium tetracarbonyl cobaltate appears at first. After 3 days the discharged reaction mixture contains 33 mg of cobalt per hour as Co$^{+2}$, 150 mg of cobalt as cobalt carbonyl hydride in the aqueous solution and 92 mg of cobalt per hour as cobalt carbonyl hydride in the offgas.

COMPARATIVE EXAMPLE

The procedure described in Example 1 is followed but Raschig rings are used instead of the ion exchanger. After 10 days a 30 ml sample of the discharge contains 253 mg of cobalt per hour as Co$^{+2}$ in the aqueous solution, 45 mg of cobalt per hour as cobalt carbonyl hydride in the aqueous solution, and in the offgas there can only be detected traces of cobalt carbonyl hydride.

We claim:

1. In an improved process for the continuous production of cobalt carbonyl hydride by treatment of an aqueous solution of a cobalt salt selected from the group consisting of cobalt sulfate, cobalt chloride, cobalt nitrate, and a lower fatty acid salt of cobalt with an excess of carbon monoxide and hydrogen at a temperature of from 50° to 200°C and a pressure of from 50 to 500 atmospheres gauge in the presence of cobalt carbonyl, wherein the improvement comprises carrying out the treatment in the presence of an activated carbon, a zeolite or a basic ion exchanger which has been loaded with cobalt carbonyl, and maintaining during the treatment a loading of 0.5 to 50 grams of cobalt in the form of one of said cobalt salts per hour per kilogram of said activated carbon, said zeolite, or said basic ion exchanger.

2. A process as claimed in claim 1 wherein a fatty acid salt of cobalt is used.

3. A process as claimed in claim 1 wherein the cobalt salt solution contains from 0.1 to 2% by weight of cobalt in the form of a salt.

4. A process as claimed in claim 1 carried out at a temperature of from 80° to 160°C.

5. A process as claimed in claim 1 carried out at a pressure of from 80 to 300 atmospheres.

6. A process as claimed in claim 1 carried out in the presence of peat charcoal which has been activated with zinc chloride, a natural three-dimensional zeolite or synthetic zeolite or a basic ion exchanger containing primary, secondary or tertiary amino groups.

* * * * *